United States Patent
Lindquist et al.

(10) Patent No.: US 10,086,289 B2
(45) Date of Patent: Oct. 2, 2018

(54) REMASTERING BY EMULATION

(71) Applicant: Sony Interactive Entertainment America LLC, San Mateo, CA (US)

(72) Inventors: Timothy Lindquist, San Mateo, CA (US); George Weising, San Mateo, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 15/359,304

(22) Filed: Nov. 22, 2016

(65) Prior Publication Data
US 2018/0140954 A1    May 24, 2018

(51) Int. Cl.
*A63F 9/24* (2006.01)
*A63F 13/69* (2014.01)

(52) U.S. Cl.
CPC ................... *A63F 13/69* (2014.09)

(58) Field of Classification Search
CPC ..... G06F 2203/04802; G06F 2209/542; A63F 13/69; G06T 15/005
See application file for complete search history.

(56) References Cited

U.S. PATENT DOCUMENTS

| | | | |
|---|---|---|---|
| 2007/0129146 A1* | 6/2007 | Tzruya | G06F 9/4443 463/42 |
| 2007/0130292 A1* | 6/2007 | Tzruya | G06F 9/4426 709/219 |
| 2009/0128573 A1* | 5/2009 | Lambe | G06F 17/30017 345/530 |
| 2009/0189893 A1* | 7/2009 | Petrov | G06F 9/505 345/419 |
| 2013/0127858 A1* | 5/2013 | Leroy | G06T 15/005 345/426 |
| 2013/0176322 A1* | 7/2013 | Bakalash | G06T 15/005 345/522 |
| 2014/0172964 A1* | 6/2014 | Lyons | A63F 13/12 709/203 |
| 2016/0335099 A1* | 11/2016 | Sim | G06F 9/44505 |

\* cited by examiner

*Primary Examiner* — Steve Rowland
(74) *Attorney, Agent, or Firm* — John L. Rogitz (57) ABSTRACT

Each asset such as a texture called for by legacy software such as a legacy computer game software has a unique identifier associated with it. The unique identifier can be rendered by imposing a hash on the asset, and then the asset stored with its identifier in a data structure. An artist remasters the textures for presentation on a higher resolution display than envisioned in the original software, and stores them back in the data structure with their identifiers. The original software is then played on the higher resolution display, with asset (such as texture) calls being intercepted, identified, and the data structure entered to retrieve the remastered asset having a matching identifier. The remastered asset is then inserted on the fly into the game presentation.

20 Claims, 7 Drawing Sheets

FIG. 1

FIG. 2  System block diagram

Creating remastered textures (1)

FIG. 3

Creating remastered textures (2)

REMASTERING BY EMULATION

FIELD

The present application relates to technically inventive, non-routine solutions that are necessarily rooted in computer technology and that produce concrete technical improvements.

BACKGROUND

As understood herein, remastering some entertainment assets such as older computer games to be played on later model consoles can entail creating an entirely new software to accommodate improved capabilities of the later model console. This is time consuming an expensive.

SUMMARY

As further understood herein, the original (legacy) software code of an entertainment asset such as a computer game designed to be played on a relatively lower powered display can be preserved for use with model consoles with improved capability displays, while effecting remastering of the presentation through emulation principles.

Thus, computer game remastering is intended herein, but it is to be understood that present principles are not limited to computer games.

Accordingly, a device includes one or more computer memories that are not transitory signals and that include instructions executable by at least one processor to intercept calls for textures from computer game software. The instructions are executable to, for at least a first intercepted call for a first texture, execute a hash on information associated with the first texture to render a result. The instructions are executable to, using the result, retrieve from a data structure a remastered texture responsive to the remastered texture being associated with a remastered texture hash from a data structure matching the result, and to insert the remastered texture into presentation of a computer game on the fly as the game is presented under control of the computer game software.

In some examples the computer game software is a legacy software designed for use on a first display having first resolution, and remastered textures are established for presentation on a second display having a second resolution higher than the first resolution without changing code in the legacy software.

In example embodiments the instructions may be executable to execute the hash on plural of the textures subject to respective intercepted calls. If desired, the instructions may be executable to, responsive to the result not matching any remastered texture hash in the database, present an original texture responsive to the first intercepted call.

In non-limiting embodiments the instructions may be executable to intercept calls for legacy audio from computer game software, retrieve, from a data structure, a remastered version of the legacy audio, and insert the remastered version into presentation of the computer game on the fly. The first intercepted call may be for an audio track or an audio sample.

Additionally, optional instructions can be executable to intercept calls for three dimensional (3D) geometry from computer game software, and for at least a first intercepted call for 3D geometry, execute a hash on information in an associated 3D geometry to render a 3D geometry result. These instructions may be executable to, using the 3D geometry result, retrieve from a data structure a remastered 3D geometry responsive to the remastered 3D geometry being associated with a remastered 3D geometry hash from a data structure matching the 3D geometry result, and insert the remastered 3D geometry into presentation of the computer game on the fly.

The device may include the processor and/or a display for presenting the computer game.

In another aspect, an apparatus includes at least one computer storage comprising instructions executable by at least one processor, and at least one processor configured to access the instructions for intercepting, from a presentation control, signals for retrieving assets. For at least some intercepted signals, the processor executing the instructions associates respective unique identifiers with respective assets associated with respective intercepted signals to render respective results. For each result, the processor accesses a data structure to locate a match, and responsive to locating a match of a result, retrieves an associated modified asset for presenting the associated modified asset on a display according to the presentation control.

A method according to the operation of the apparatus also is provided.

In another aspect, a device includes one or more computer memories that are not a transitory signals and that include instructions executable by at least one processor for intercepting calls for assets from computer game software, and for at least a first intercepted call for a first asset, associating a first unique identifier with the first asset. The instructions are executable for determining whether the first unique identifier matches an entry in a remastering data structure, and responsive to the first unique identifier matching an entry in the data structure, continuing to intercept the calls. However, responsive to the first unique identifier not matching an entry in the data structure, the first unique identifier and the first asset are stored in the data structure. The instructions are executable for outputting the first asset to a remastering computer. A remastered asset is received from the remastering computer, with the remastered asset being a higher resolution version of the first asset, and the remastered asset is associated, in the data structure, with a unique identifier.

A method according to the operation of the device also is contemplated.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to distributed computer game networks.

The disclosure teaches that elements of an entertainment asset, and in specific embodiments textures of computer games, are remastered and presented on the fly using the legacy game software without recompiling the software. Thus, for example, a computer game designed to be played on a relatively lower resolution display such as a cell phone display, portable game display such as a PlayStation® Portable (PSP), or an older low resolution game display can be played on a relatively higher resolution display such as a high definition (HD) or ultra high definition (UHD) display or higher resolution game display such as a PlayStation®-3 or PlayStation®-4 display without modifying the legacy game software but still providing high quality remastered images and audio. Remastering is desirable because low resolution textures presented on high resolution displays have blurry or otherwise disagreeable appearances.

A system herein may include server and client components, connected over a network such that data may be exchanged between the client and server components. The client components may include one or more computing devices including game consoles such as but not limited to Sony PlayStation™ and Microsoft Xbox™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a computer game console system with display or an Internet-enabled TV with a TV tuner (equivalently, set top box controlling a TV). However, the AVD 12 alternatively may be an appliance or household item, e.g.

computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
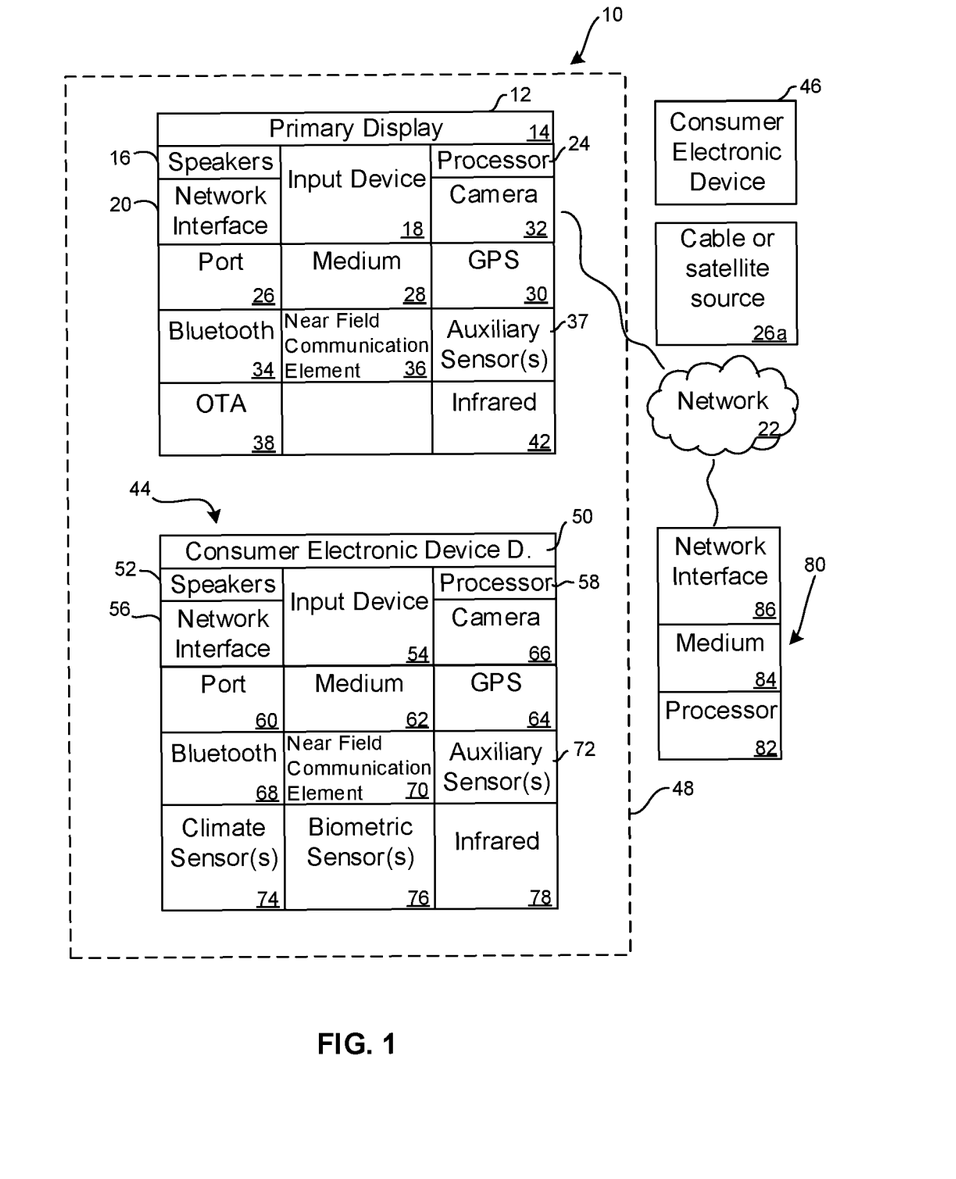
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Figure 2:
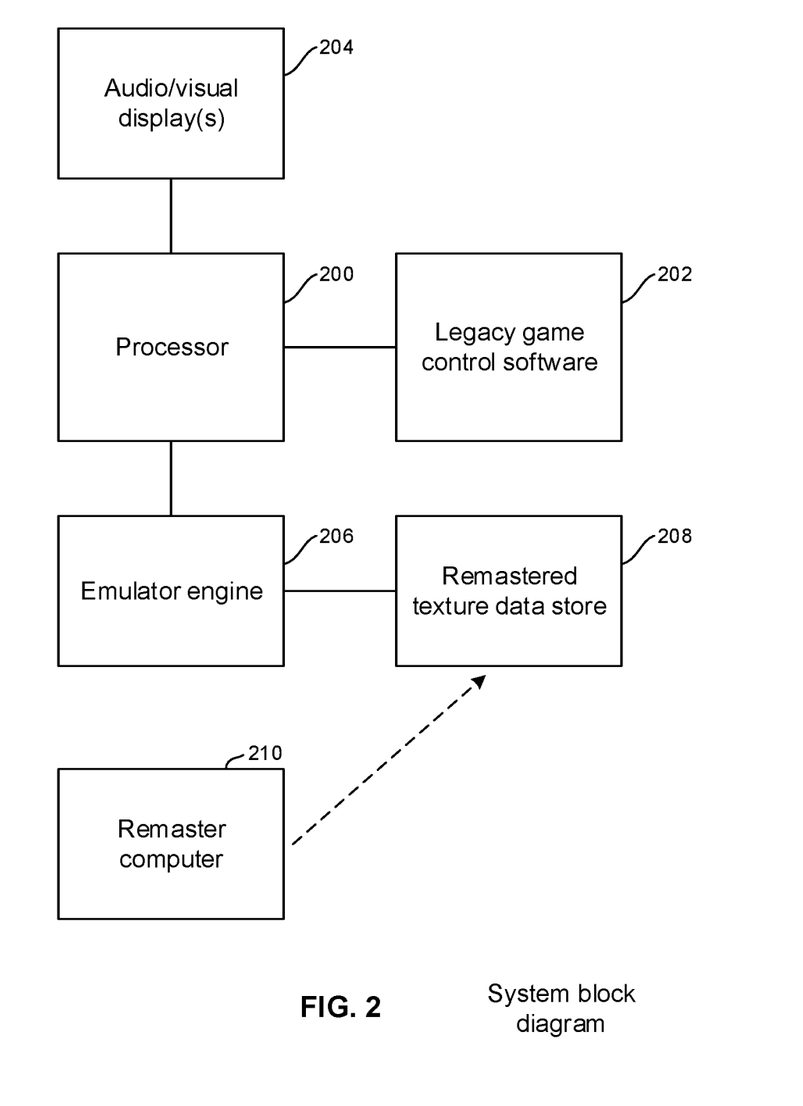
FIG. 2 is block diagram of an example system.

FIG. 2 illustrates an example system which may include any of the appropriate components described above. A processor 200 such as a computer game console processor executes a legacy game controller 202 typically implemented in software to present a computer game on one or more audio and/or video displays 204. As indicated previously, the game software, which is but an example of an entertainment asset that may leverage present principles, is assumed for disclosure purposes to have been designed for playing a computer game on a relatively low resolution display. The A/V display 204, on the other hand, is assumed to have a higher resolution than the display for which the legacy software was targeted.

As disclosed further below, the processor 200 may execute an emulator engine 206, typically embodied in software, to insert remastered textures from a data store 208 into the game on the fly as it is being presented on the A/V/display 204. As also discussed is greater detail below, the remastered textures in the data store 208 are produced by one or more remastering computers 210.

The emulator engine 206 may be regarded as a software interpreter that effects emulation without recompiling code to replace substantially all of the low resolution textures called for by the game 202 with higher resolution remastered versions of those textures. By "substantially all" of the textures is meant all of the low resolution legacy textures except for possibly a small percentage, under 10%, that are not remastered either by design or inadvertence.

Figure 3:
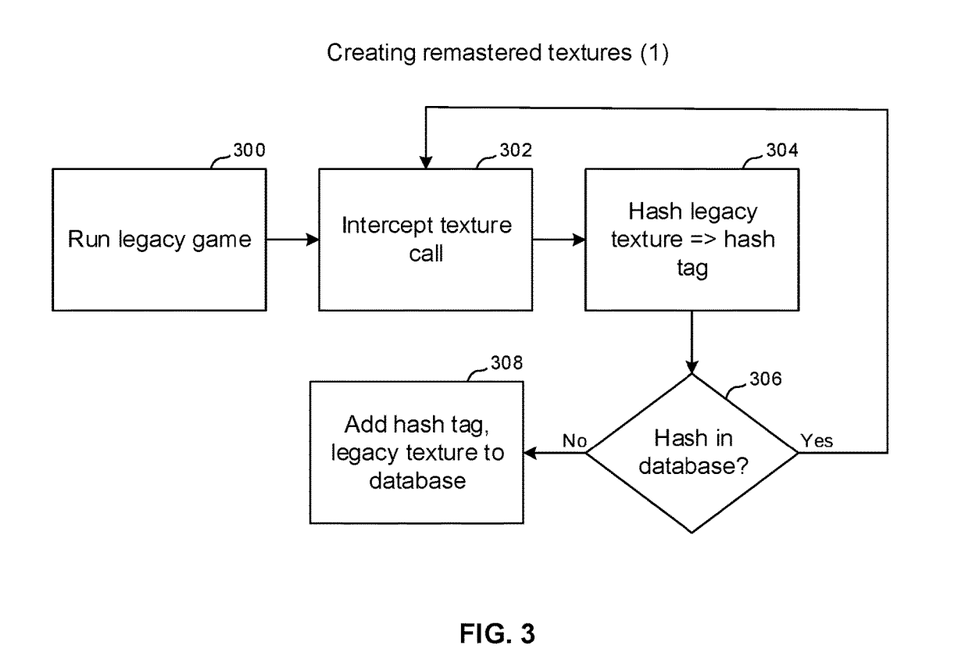
FIG. 3 is a flow chart of example logic for creating remastered game textures.
Figure 4:
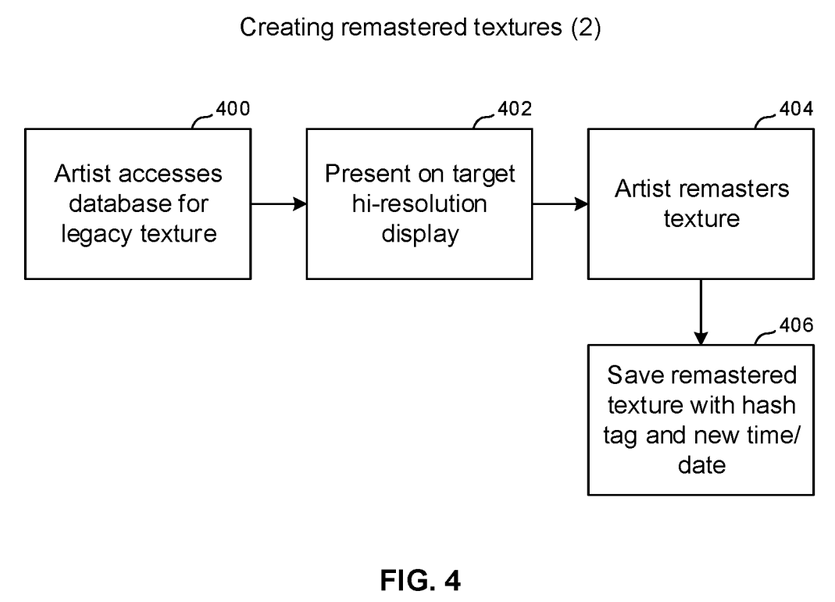
FIG. 4 is a flow chart of additional example logic for creating remastered game textures.
Figure 5:
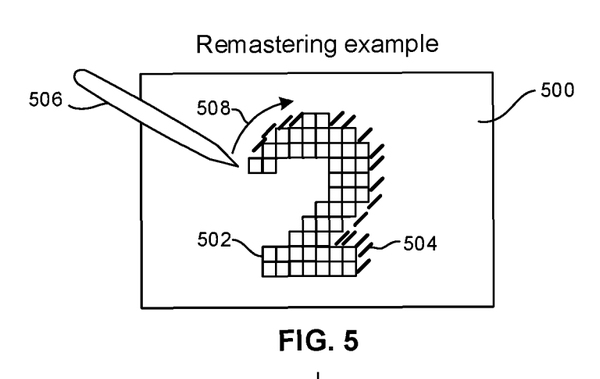
FIGS. 5-7 are screen shots showing an example remastering operation.
Figure 6:
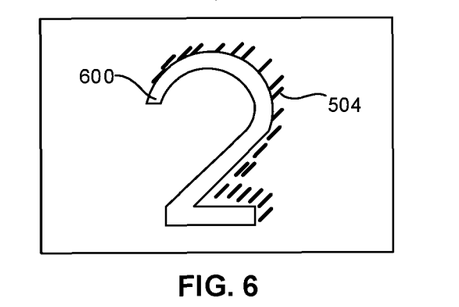
Figure 7:
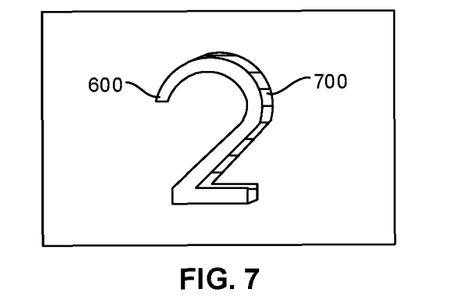

FIGS. 3 and 4 illustrate logic for creating remastered textures, and FIGS. 5-7 present a visual example of a portion of the remastering process. Commencing at block 300, the legacy game 202 is executed on a remastering computer 210.

As the game runs, it issues calls for assets such as computer game textures, which calls are intercepted at block 302. An algorithm is executed on information pertaining to the called-for textures to render respective results. In example implementations, the algorithm includes a hash such as but not limited to a secure hash algorithm, it being understood that other hash functions are contemplated. The hash is executed on all or part of the texture. For example, the hash may be executed on a texture identification or other portion of the texture. The result of the hash is a hash value or hash tag.

Proceeding to diamond 306, it is determined whether the hash tag resulting from the hash in block 304 matches a hash tag in a data structure accessible to the processor. Of course, the test at decision diamond 306 will be negative the first time the game is played because the data structure initializes in an unpopulated state. A negative test causes the hash tag and associated texture to be added to the data structure (such as a database) at block 308.

Because computer games often entail multiple branches it is usually necessary to run the game multiple times to follow each branch, to ensure that all (or substantially all) of the legacy textures with associated hash tags are added to the data structure. Accordingly, it will be the case that from time to time a call for a previously stored texture will be intercepted and thus cause the test at diamond 306 to be positive, which simply loops the logic back to the next texture call.

FIG. 4 shows that as legacy low-resolution textures are added to the data structure in FIG. 3, an artist operating the same or a different remastering computer may employ the process shown in FIG. 4 to remaster the low resolution textures into higher resolution textures. The artist accesses the data structure to retrieve a legacy texture at block 400. The legacy texture is presented on a higher definition display at block 402, preferably on the display of the game console targeted for presenting the remastered textures. The artist remasters the texture at block 404 and saves the remastered texture and associated hash tag at block 406 back to the storage location from whence the original texture came, preferably replacing the original texture with the remastered texture. The hash tag may include a date/time stamp that indicates when the associated texture was remastered.

FIGS. 5-7 illustrate. A high resolution display 500 which may be a touch screen display presents an original low-resolution texture 502, in this case, a 3D numeral "2". Because the original low-resolution texture 502 is being presented on a higher resolution display than originally intended, its appearance, as shown, is blocky or blurry, and the shading 504 intended to give the numeral "2" a 3D appearance is likewise blocky/blurry.

To remaster the texture, an artist may employ her finger or a stylus 506 to trace a numeral "2" over the original texture, as indicated by the arrow 508. This input causes the graphic editing software to present a high resolution texture 600 as shown in FIG. 6, which shows a smooth, non-blocky, non-blurring remastered portion of the original texture.

The blocky/blurry shading 504, however, remains to be remastered. This is also effected by the artist drawing a shading border 700 as shown in FIG. 7 that accurately captures, for the human eye, a 3D presentation of the numeral "2". The example remastered texture shown in FIG. 7 is then saved back to the data structure with its hash tag with updated timestamp as indicated at block 406 in FIG. 4. The process is repeated to remaster the original textures in the data structure until all (or substantially all) original textures have been replaced by remastered versions.

Figure 8:
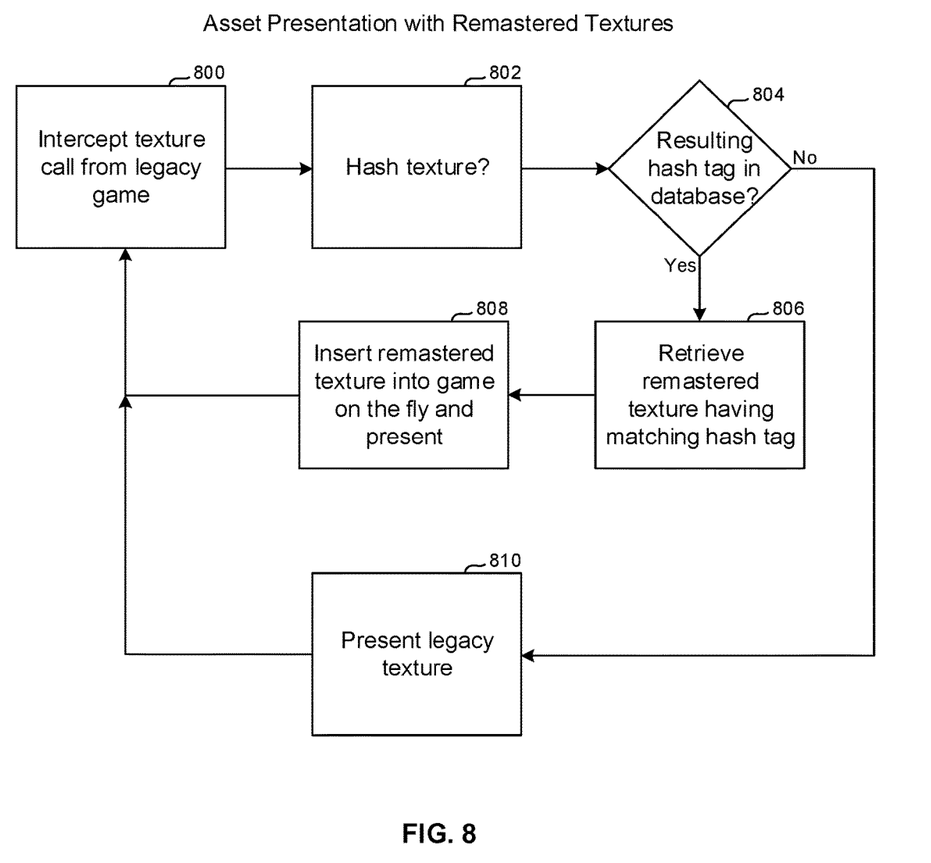
FIG. 8 is a flow chart of example logic for presenting remastered textures into a legacy computer game on the fly.

FIG. 8 illustrates game play using the legacy game software 202 to present a remastered computer game on the high resolution display 204 without recompiling the game software. At block 800, as each call from the software for a texture is made, it is intercepted and hashed at block 802 using the same function that was used to generate the remastered textures. The resulting hash tag is used as entering argument to the data structure 208, which is a copy of (or otherwise derived from) the data structure to which remastered textures are added in block 308 of FIG. 3. If the hash tag has a match in the data structure, as it is expected to, the remastered texture associated with the matching hash tag is retrieved at block 806 and presented in the computer game display on the fly at block 808. The logic then loops back to block 800 to intercept the next texture call from the legacy game software.

Recognizing the possibility that not all original textures may have been remastered, in the event that the hash tag at diamond 804 has no match in the data structure, the legacy texture may be presented at block 810. Or, no texture at all may be presented. In either case, since a texture is presented for only a short moment of time until an ensuing texture is called, the temporary presentation of a low resolution texture or no texture at all may not be unduly distracting.

Figure 9:
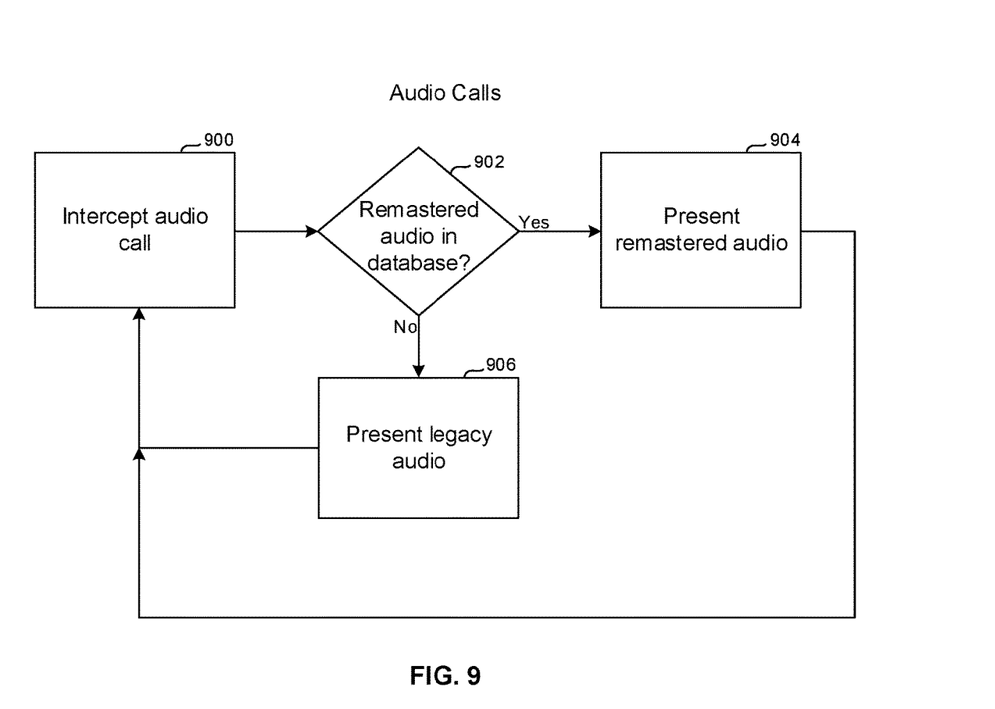
FIG. 9 is a flow chart of example logic for presenting remastered audio.

The above principles may be used in conjunction with remastering lower resolution original audio that accompanied the original entertainment asset. FIG. 9 illustrates. A call for an audio asset such as but not limited to an audio track or audio sample is intercepted at block 900. If it is determined at diamond 902 that a higher resolution remastered version of the audio is present in a data structure such as that containing the remastered textures or another, separate audio database, the remastered audio is presented at block 904. Otherwise, the original audio is presented at block 906, or no audio at all may be presented. Audio fingerprints, for instance, may be used to match the audio called for at block 900 with matching remastered audio. As an example, audio samples originally provided in a computer game at 11 k can be remastered to 44.1 k.

Principles above pertaining to textures may also be applied to 3D geometries called for by an entertainment asset.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   intercept calls for textures from computer game software that is a legacy software designed for use with a first resolution;
   for at least a first intercepted call for a first texture, execute a hash on information associated with the first texture to render a result;
   using the result, retrieve, from a data structure, a remastered texture responsive to the remastered texture being associated with a remastered texture hash from a data structure matching the result, the remastered texture being generated by a remastering computer based on artist augmentation of the first texture to render the remastered texture; and insert the remastered texture into presentation of a computer game on the fly as the game is presented under control of the computer game software.

2. The device of claim 1, wherein the legacy software is designed for use on a first display having the first resolution, and the remastered textures are established for presentation on a second display having a second resolution higher than the first resolution without changing code in the legacy software.

3. The device of claim 1, wherein the instructions are executable to:
execute the hash on plural of the textures subject to respective intercepted calls.

4. The device of claim 1, wherein the instructions are executable to:
responsive to the result not matching any remastered texture hash in the database, present an original texture responsive to the first intercepted call.

5. The device of claim 1, wherein the instructions are executable to:
intercept calls for legacy audio from computer game software;
retrieve, from a data structure, a remastered version of the legacy audio; and
insert the remastered version into presentation of the computer game on the fly.

6. The device of claim 5, wherein the first intercepted call is for an audio track.

7. The device of claim 5, wherein the first intercepted call is for an audio sample.

8. The device of claim 1, wherein the instructions are executable to:
intercept calls for three dimensional (3D) geometry from computer game software;
for at least a first intercepted call for 3D geometry, execute a hash on information in an associated 3D geometry to render a 3D geometry result;
using the 3D geometry result, retrieve, from a data structure, a remastered 3D geometry responsive to the remastered 3D geometry being associated with a remastered 3D geometry hash from a data structure matching the 3D geometry result; and
insert the remastered 3D geometry into presentation of the computer game on the fly.

9. The device of claim 1, comprising the at least one processor.

10. The device of claim 9, comprising at least one display for presenting the computer game.

11. An apparatus comprising:
at least one computer storage comprising instructions executable by at least one processor; and
at least one processor configured to access the instructions for:
intercepting, from a presentation control of legacy computer game software, signals for retrieving assets;
for at least some intercepted signals, generating respective unique identifiers and associating the respective unique identifiers with respective assets associated with respective intercepted signals to render respective results;
for at least a first result associated with a respective first asset, accessing a data structure to locate a match;
responsive to locating a match, testing a second result;
responsive to not locating a match, adding the first result to the data structure;
responsive to not locating a match, outputting the first asset for remastering thereof;
receiving a remastered asset corresponding to the first asset; and
associating the remastered asset with the first result in the data structure.

12. The apparatus of claim 11, wherein the instructions are executable for:
responsive to not locating a match of a result, presenting an original asset on a display according to the presentation control.

13. The apparatus of claim 11, wherein the presentation control is implemented by software.

14. The apparatus of claim 13, wherein the software is computer game software.

15. The apparatus of claim 11, wherein the assets include computer game textures.

16. The apparatus of claim 11, wherein the assets include audio elements.

17. The apparatus of claim 11, wherein the signals include software-generated calls.

18. The apparatus of claim 11, wherein the unique identifiers are rendered by executing an algorithm on the respective assets.

19. The apparatus of claim 11, wherein each remastered asset is inserted into presentation of a computer game on the fly as the game is presented under control of computer game software.

20. A method, comprising:
intercepting calls for assets from computer game software;
for at least a first intercepted call for a first asset, generating a first unique identifier;
determining whether the first unique identifier matches an entry in a remastering data structure;
responsive to the first unique identifier matching an entry in the data structure, continuing to intercept the calls;
responsive to the first unique identifier not matching an entry in the data structure, storing the first unique identifier and the first asset in the data structure;
outputting the first asset to a remastering computer;
receiving from the remastering computer a remastered asset based on an artist modifying the first asset, the remastered asset being a higher resolution version of the first asset; and
associating, in the data structure, the remastered asset with a unique identifier.

* * * * *